(12) United States Patent
Ito et al.

(10) Patent No.: US 7,596,912 B2
(45) Date of Patent: Oct. 6, 2009

(54) INTEGRATED WINDOW ASSEMBLY AND COMPONENTS

(75) Inventors: Tsutomu Ito, Marietta, GA (US); Jin Goto, Marietta, GA (US)

(73) Assignee: YKK Corporation of America, Marietta, GA (US)

( * ) Notice: Subject to any disclaimer, the term of this patent is extended or adjusted under 35 U.S.C. 154(b) by 359 days.

(21) Appl. No.: 11/768,564

(22) Filed: Jun. 26, 2007

(65) Prior Publication Data

US 2009/0000225 A1     Jan. 1, 2009

(51) Int. Cl.
*E06B 1/04* (2006.01)
*E06B 3/00* (2006.01)

(52) U.S. Cl. .............. 52/204.5; 52/656.5; 52/656.9; 52/745.16; 49/504; 403/187

(58) Field of Classification Search ............ 52/204.1, 52/204.5, 656.5, 656.7, 656.9, 745.15, 745.16; 49/365, 504; 403/187, 188, 230
See application file for complete search history.

(56) References Cited

U.S. PATENT DOCUMENTS

| 2,889,588 | A | * | 6/1959 | Gillespie .................... 49/121 |
| 3,816,011 | A | * | 6/1974 | Biebuyck et al. ............ 403/187 |
| 4,013,371 | A | * | 3/1977 | Nagase ....................... 403/187 |
| 5,435,106 | A | * | 7/1995 | Garries et al. .............. 52/204.5 |
| 5,461,837 | A |   | 10/1995 | Chaney et al. |
| 5,618,127 | A | * | 4/1997 | Tonsmann et al. .......... 403/230 |
| 6,125,606 | A | * | 10/2000 | Larsson ....................... 52/836 |
| 6,360,498 | B1 |  | 3/2002 | Westphal |
| 6,523,311 | B2 |  | 2/2003 | Edger |
| 6,662,512 | B2 | * | 12/2003 | Westphal ................... 52/204.5 |
| 6,722,089 | B2 | * | 4/2004 | Budzinski .................. 52/204.5 |
| 2004/0244317 | A1 | * | 12/2004 | Tan ........................... 52/204.1 |
| 2006/0185294 | A1 |   | 8/2006 | Langer et al. |
| 2008/0216424 | A1 | * | 9/2008 | Westphal et al. ........... 52/204.5 |

FOREIGN PATENT DOCUMENTS

| DE | 33 06 426 C2 | 5/1986 |
| EP | 0 967 358 A2 | 12/1999 |
| EP | 0 967 358 A3 | 10/2000 |
| JP | 10238222 | 9/1998 |

\* cited by examiner

*Primary Examiner*—Brian E Glessner
(74) *Attorney, Agent, or Firm*—Alston & Bird LLP (57) ABSTRACT

Various embodiments of the invention provide an integrated window assembly that includes a mullion, a window frame to be secured relative to the mullion, a reinforcement member positioned within the mullion, sashes on each side of the mullion, and an integrally formed connector positioned between the reinforcement member within the mullion, the window frame, and the sashes. In various embodiments, the integrally formed connector and the reinforcement member provide improved wind resistance for the window assembly, according to various embodiments of the invention. For example, in a particular embodiment, the window assembly can withstand about 75 lbs. per square foot of pressure with no permanent deflection in excess of about 0.4%.

12 Claims, 10 Drawing Sheets

INTEGRATED WINDOW ASSEMBLY AND COMPONENTS

BACKGROUND OF THE INVENTION

A window assembly that includes two or more windows typically utilizes a vertical mullion between each window and a horizontal window frame coupled to each end of the mullion (above and below each window) to join the windows into a single assembly. To increase the strength of the mullions and/or window frames used in the window assemblies, metal reinforcement members may be used within the materials.

The reinforcement members, window frames, and mullions may be joined together using fasteners, for example. However, the interfaces between the window frames and the ends of the mullion pivot (or deflect) relative to each other when subjected to wind pressure, which results in cracked window panes or other portions of the window assembly or may reduce the integrity of the window assembly over time. Thus, a need in the art exists for an improved window assembly and components for reducing the deflection of the mullion and the window frames relative to each other when subjected to wind pressure and providing increased rigidity and stability when installed.

BRIEF SUMMARY OF THE INVENTION

According to various embodiments of the invention, an integrated window assembly for joining a window frame with a mullion is provided. The assembly includes a window frame, a mullion, a reinforcement member, and an integrally formed connector. The window frame includes an upper surface and a lower surface and defines a channel along the lower surface. The window frame further defines one or more apertures that each extend through the upper surface and the channel of the window frame. The mullion includes a first end, a second end, and an elongated body extending between the first end and the second end. In addition, the mullion defines a first cavity adjacent the first end that extends at least partially through the elongated body. The reinforcement member is positioned within the first cavity of the mullion and defines a second cavity adjacent an end of the reinforcement member that is adjacent the first end of the mullion and one or more apertures for receiving a fastener. The integrally formed connector includes a mullion engaging portion, a frame engaging portion, a first sash engaging portion, and a second sash engaging portion. The mullion engaging portion is positioned laterally between the first and second sash engaging portions, and the frame engaging portion is positioned vertically adjacent the mullion engaging portion and the first and second sash engaging portions. At least a portion of the mullion engaging portion is configured for engaging the second cavity of the reinforcement member, at least a portion of the frame engaging portion is configured for engaging the channel of the window frame, and at least a portion of the first and second sash engaging portions are configured for engaging a channel defined by each of a first sash and second sash, respectively. The integrally formed connector further defines one or more apertures, and the one or more apertures of the integrally formed connector and the reinforcement member are vertically aligned when the mullion engaging portion is positioned within the cavity of the reinforcement member. Furthermore, the one or more apertures of the window frame are vertically alignable with the one or more apertures of the integrally formed connector and the reinforcement member and are configured for receiving a fastener for securing the integrally formed connector, the reinforcement member, and the window frame together when the frame receiving portion is positioned within the channel of the window frame.

According to another embodiment of the invention, an integrated window assembly for joining a window frame with a mullion is provided. The assembly includes a window frame, a mullion, and an integrally formed connector. The window frame includes an upper surface and a lower surface and defines a channel along the lower surface. The window frame further defines one or more apertures that each extend through the upper surface and the channel of the window frame. The mullion includes a first end, a second end, and an elongated body extending between the first end and the second end. In addition, the mullion defines a cavity adjacent the first end that extends at least partially through the elongated body and one or more apertures for receiving a fastener. The integrally formed connector includes a mullion engaging portion, a frame engaging portion, a first sash engaging portion, and a second sash engaging portion. The mullion engaging portion is positioned laterally between the first and second sash engaging portions, and the frame engaging portion is positioned vertically adjacent the mullion engaging portion and the first and second sash engaging portions. At least a portion of the mullion engaging portion is configured for engaging the cavity of the mullion, at least a portion of the frame engaging portion is configured for engaging the channel of the window frame, and at least a portion of the first and second sash engaging portions are configured for engaging a channel defined by each of a first sash and second sash, respectively. The integrally formed connector further defines one or more apertures, and the one or more apertures of the integrally formed connector and the mullion are vertically aligned when the mullion engaging portion is positioned within the cavity of the mullion. Furthermore, the one or more apertures of the window frame are vertically alignable with the one or more apertures of the integrally formed connector and the mullion and are configured for receiving a fastener for securing the integrally formed connector, the mullion, and the window frame together when the frame receiving portion is positioned within the channel of the window frame.

Various other embodiments of the invention provide a method of assembling an integrated window to a mullion. The method comprises the steps of: (1) providing a mullion that includes a first end, a second end, and an elongated body portion that extends between the first end and the second end and defines a first cavity adjacent the first end and extends at least partially through the elongated body portion, (2) positioning a reinforcement member into at least a portion of the first cavity; (3) providing an integrally formed connector that includes a mullion engaging portion, a frame engaging portion, a first sash engaging portion, and a second sash engaging portion, wherein the mullion engaging portion is positioned laterally between the first and second sash engaging portions, and the frame engaging portion is positioned vertically adjacent the mullion engaging portion and the first and second sash engaging portions; (4) positioning the mullion engaging portion of the integrally formed connector within a second cavity defined by the reinforcing member adjacent an end of the reinforcement member that is positioned adjacent the first end of the mullion such that the frame engaging portion of the integrally formed connector extends above the first end of the mullion and at least a portion of the first and second sash engaging portions extends laterally adjacent each side of the first end of the mullion; (5) positioning a window frame adjacent the frame engaging portion of the integrally formed connector such that a channel defined by the window frame receives the frame engaging portion; (6) securing the mullion and the window frame together by inserting at least one fastener through the window frame, the connector, and the reinforcing member; and (7) fitting a first sash adjacent a first side of the window frame and the mullion and a second sash adjacent a second side of the window frame and the mullion, wherein the first sash defines at least one channel for receiving the first sash engaging portion and the second sash defines at least one channel for receiving the second sash engaging portion.

BRIEF DESCRIPTION OF THE DRAWINGS

Having thus described various embodiments of the invention in general terms, reference will now be made to the accompanying drawings, which are not necessarily drawn to scale, and wherein:

DETAILED DESCRIPTION OF THE INVENTION

Various embodiments of the invention are described more fully hereinafter with reference to the accompanying drawings, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

Brief Summary

Various embodiments of the invention provide an integrated window assembly that includes a mullion, a window frame for securing relative to the mullion, a reinforcement member positioned within the mullion, sashes on either side of the mullion and the window frame, and an integrally formed connector positioned between the reinforcement member within the mullion, the window frame, and the sashes. In various embodiments, the connector and the reinforcement member provide improved wind resistance for the window assembly, according to various embodiments of the invention. For example, in a particular embodiment, the window assembly can withstand about 75 lbs. per square foot of pressure with no permanent deflection in excess of about 0.4%.

Figure 1:
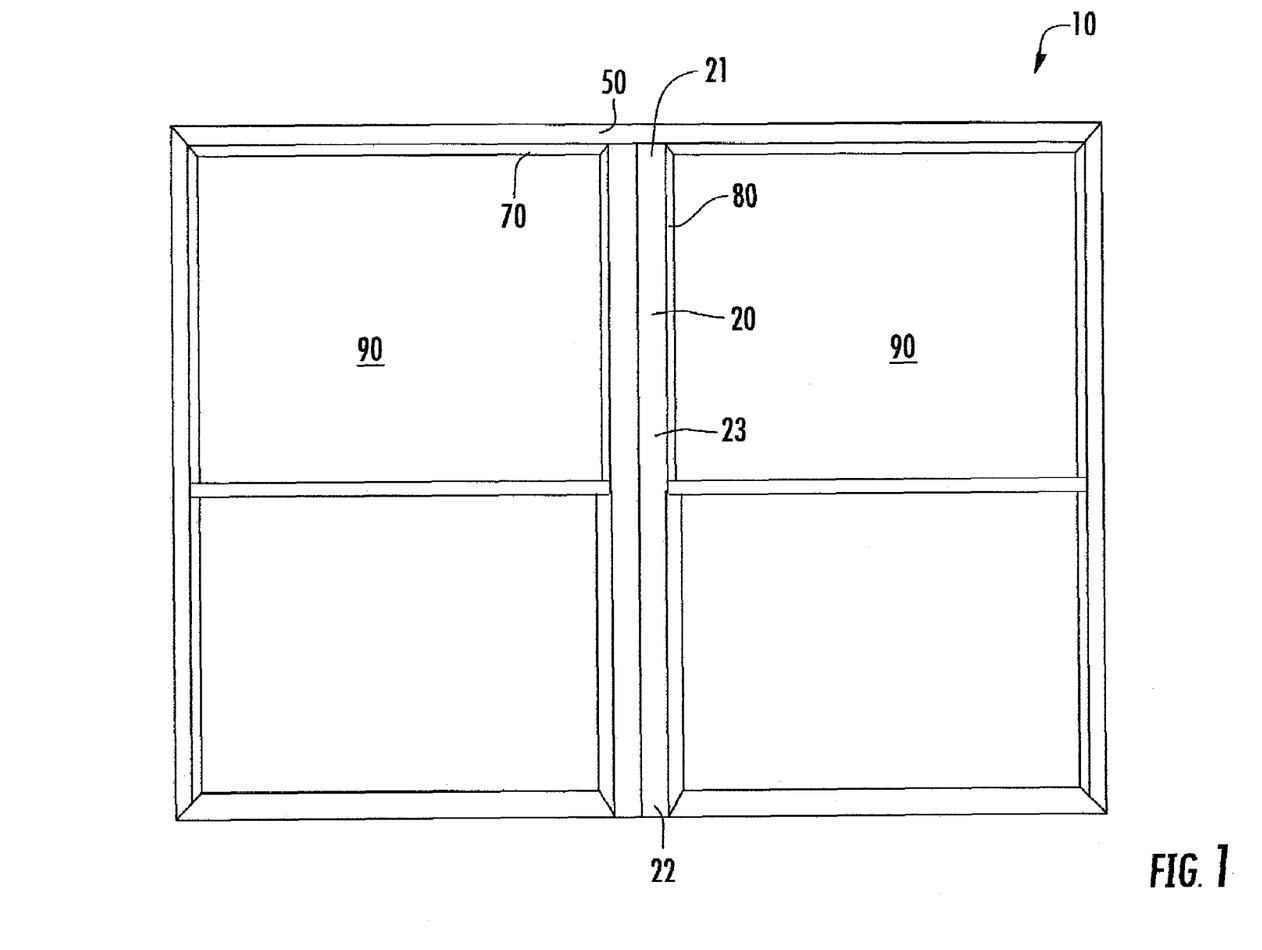
FIG. 1 illustrates a plan view of a window assembly according to various embodiments of the invention.
Figure 2:
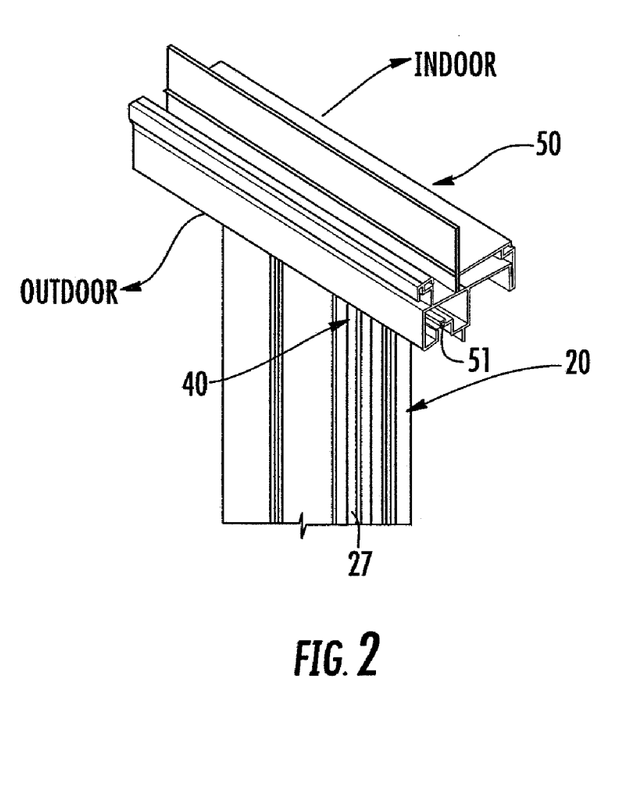
FIG. 2 illustrates a perspective view of a portion of the window assembly comprising a mullion, an upper window frame, and an integrally formed connector according to various embodiments of the invention.
Figure 3:
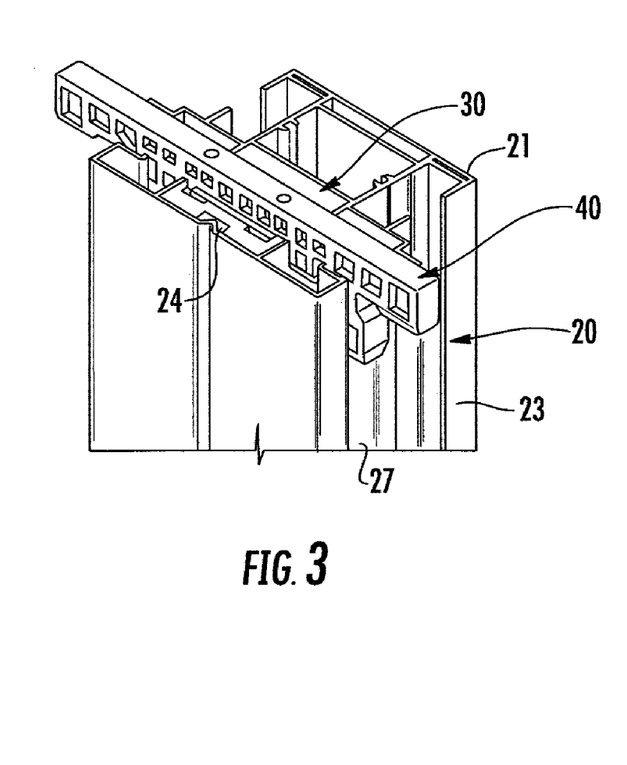
FIG. 3 illustrates a top perspective view of a portion of the window assembly shown in FIG. 2 comprising the mullion and the integrally formed connector.
Figure 16:
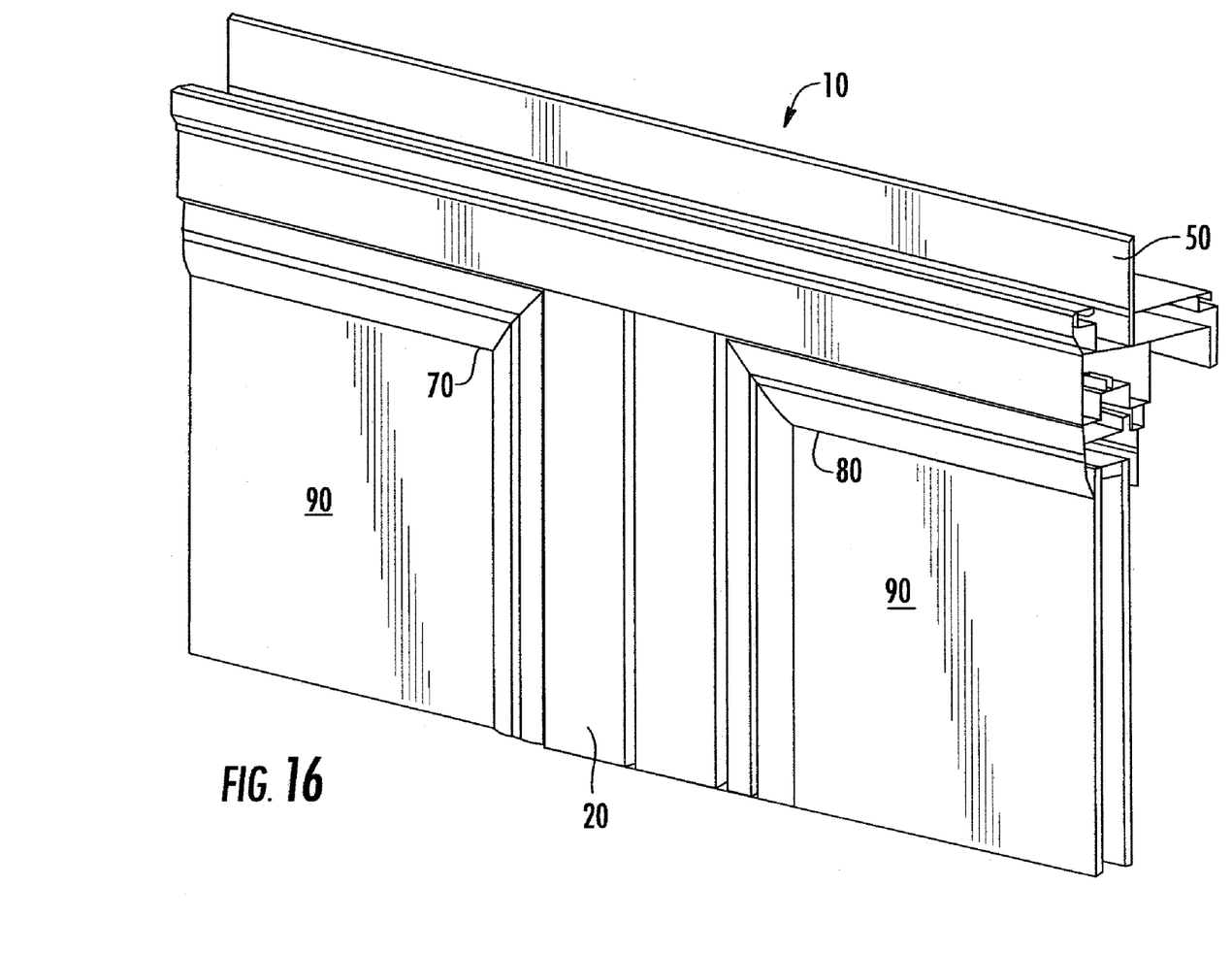
FIG. 16 illustrates a perspective view of the window assembly according to various embodiments of the invention.
Figure 17:
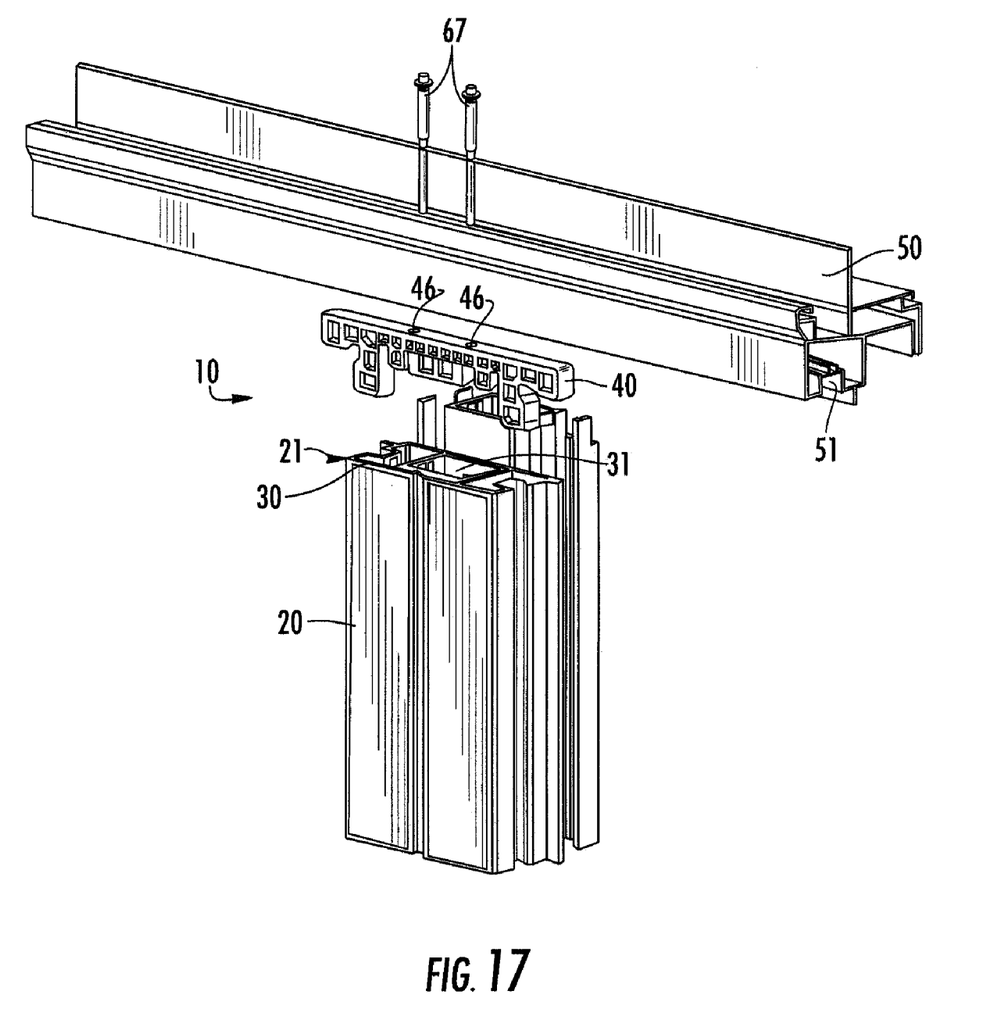
FIG. 17 illustrates an exploded view of a portion of the window assembly comprising a mullion, an upper window frame, an integrally formed connector, and fasteners according to various embodiments of the invention.

FIGS. 1 and 16 illustrate a window assembly according to various embodiments of the invention. The window assembly 10 includes an upper window frame 50, a mullion 20, a first sash 70, a second sash 80, and window panes 90 received by each sash 70, 80. In addition, as shown in FIGS. 2, 3, and 17, the window assembly 10 further includes a reinforcement member 30 that fits within a cavity 24 of a first end 21 of the mullion 20 and a connector 40 that is received within a cavity 31 of the reinforcement member 30, a channel 51 of the upper window frame 50, and channels defined by each sash 70, 80 (not shown). The connector 40, the window frame 50, and the reinforcement member 30 are coupled together by two fasteners 67 that extend through apertures 46 defined in the connector 40, apertures 32 defined in the reinforcement member 30, and apertures 52 defined in the window frame 50. The assembly reduces deflection of the window frame 50, sashes 70, 80, and the mullion 20 relative to each other when the window assembly 10 subjected to wind pressure, for example.

Each element of the window assembly 10 is described below in more detail.

Mullion

Figure 5:
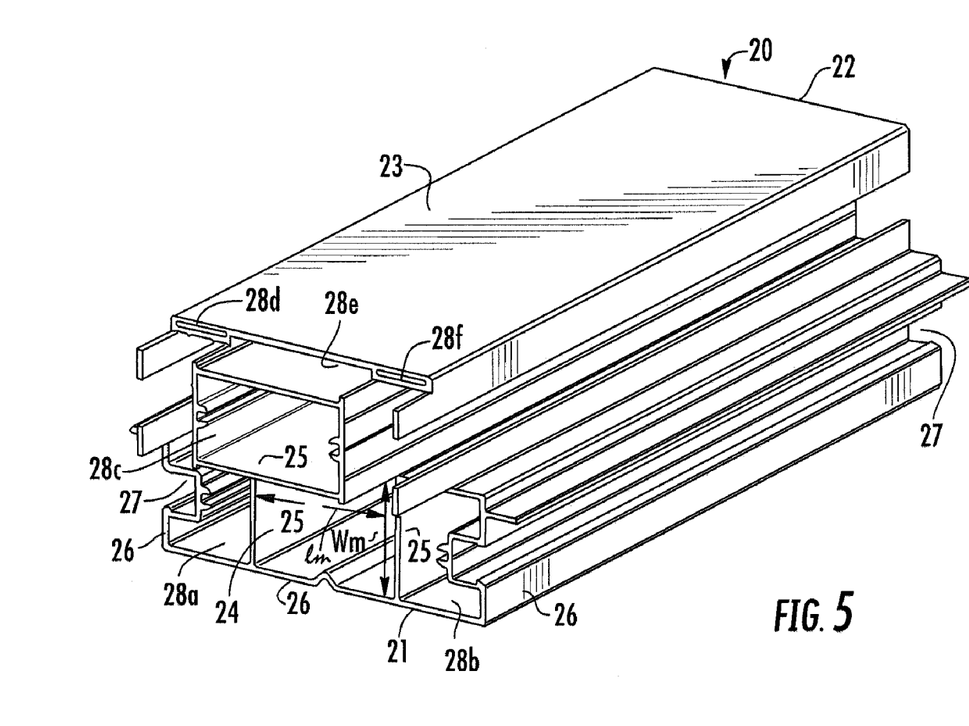
FIG. 5 illustrates a perspective view of the mullion shown in FIG. 2.

FIG. 5 illustrates a mullion 20 according to various embodiments of the invention. The mullion 20 comprises a first end 21, a second end 22, an elongated body 23 extending between the first end 21 and the second end 22, and a first cavity 24 defined by internal walls 25 of the mullion 20 adjacent the first end 21 of the mullion 20. The mullion 20 further includes external walls 26 that define channels 27 that receive and guide the window sashes 70, 80.

In one embodiment of the invention, the mullion 20 is formed of vinyl or other polymeric material, which results in a relatively lightweight mullion 20. However, it should be understood that the mullion 20 may be formed of another suitable material other than vinyl or polymeric material, such as metal (e.g., aluminum) or wood, for example. In addition, the mullion 20 defines one or more cavities that extend at least partially through the elongated body 23. The one or more hollow cavities further contribute to reducing the weight of the mullion 20. For example, as shown in FIG. 5, the mullion 20 defines the first cavity 24 and six additional cavities 28a-28f. These cavities 24, 28a-28e extend through the length of the elongated body 23 from the first end 21 to the second end 22.

Reinforcement Member

Figure 4:
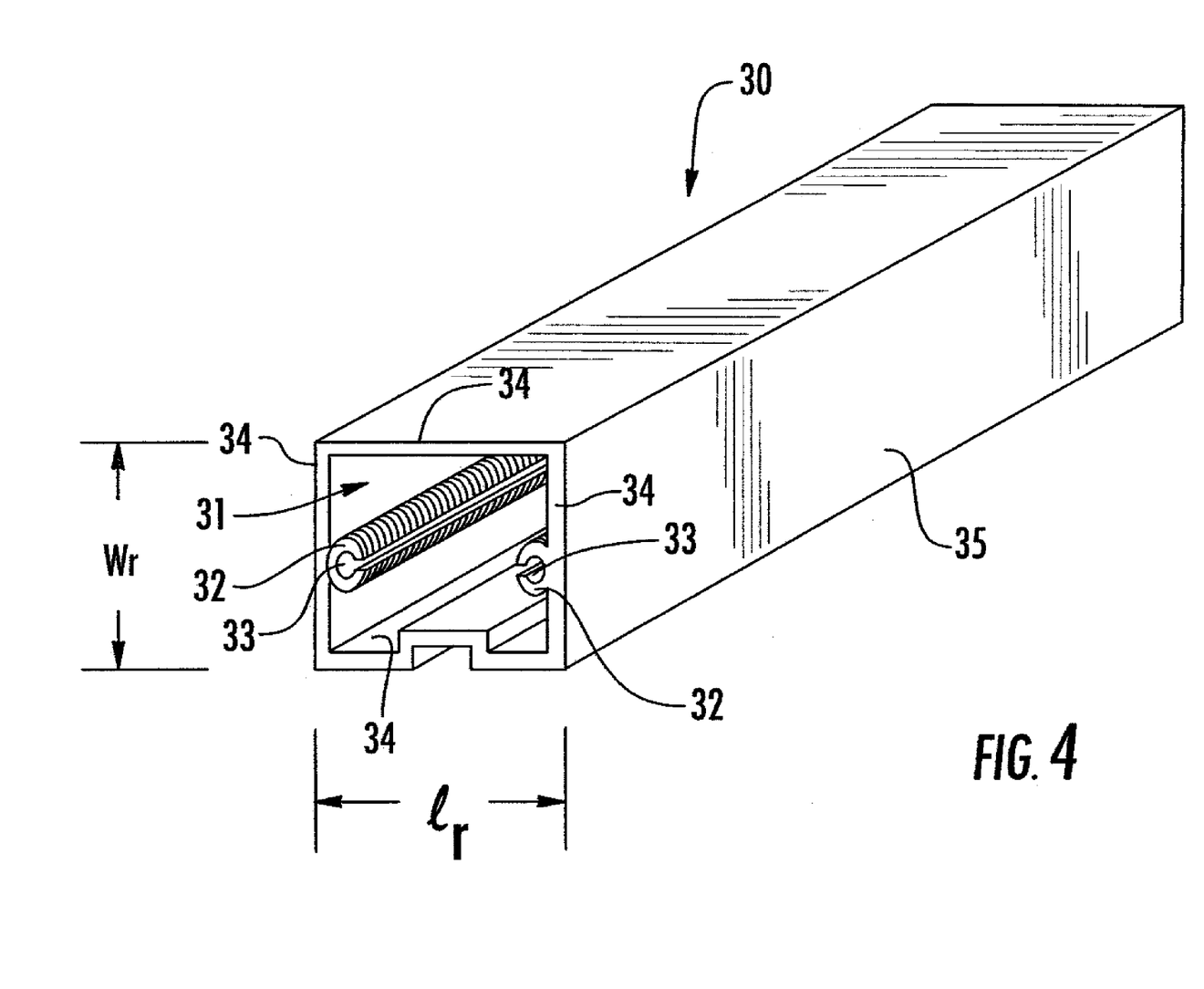
FIG. 4 illustrates a perspective view of a reinforcement member according to various embodiments of the invention.

FIG. 4 illustrates a reinforcement member 30 according to various embodiments of the invention. The reinforcement member 30 generally has a cross sectional shape that corresponds with the cross sectional shape of the cavity 24 defined by the mullion 20 to allow the reinforcement member 30 to fit within the cavity 24. In the particular embodiment shown in FIG. 4, the reinforcement member 30 includes four walls 34 that form a substantially rectangular cross-section and define an elongated body 35. The elongated body 35 of the reinforcement member 30 has an outer length $l_r$ and width $w_r$ that is slightly less than the inner length $l_m$ and width $w_m$ of the first cavity 21 of the mullion 20 such that the reinforcement member 30 fits within the first cavity 21 of the mullion. The walls 34 define a cavity 31 that extends from one end of the reinforcement member 30 through at least a portion of the elongated body 35. In the embodiment shown in FIG. 4, the cavity 31 extends though the elongated body 35 between each end of the reinforcement member 30.

In one embodiment, the reinforcement member 30 is formed of a metal material, such as aluminum or steel, for example. The material used to form the reinforcement member 30 may be chosen depending on the size of the mullion, the shape of the cavity of the mullion into which the reinforcement member is positioned, the weight constraints for the window assembly, and/or the expected wind loads for the window assembly 10. For example, if the window assembly 10 is expected to be installed in a building that is located in a windy or storm-prone geographical area, the reinforcement member 30 may be formed of steel to withstand the expected wind loads. Furthermore, if the window assembly 10 is to be installed in a building that is not typically subject to windy or stormy conditions, the reinforcement member 30 may be formed of aluminum, which is more lightweight than steel and less strong.

The reinforcement member 30 further defines at least one aperture for receiving a fastener to secure the reinforcement member 30 to the connector 40 and the window frame 50. In the embodiment shown in FIG. 4, a protrusion 32 extends into the cavity 31 from each of two opposing walls of the reinforcement member 30 defined by the walls 34. Each of the protrusions 32 further define an aperture 33 for receiving a fastener for securing the reinforcement member 30 to the connector 40 and the window frame 50. In an alternative embodiment, one or more of the walls 34 of the reinforcement member 30 may define one or more apertures for receiving the fastener.

Integrally Formed Connector

Figure 6:
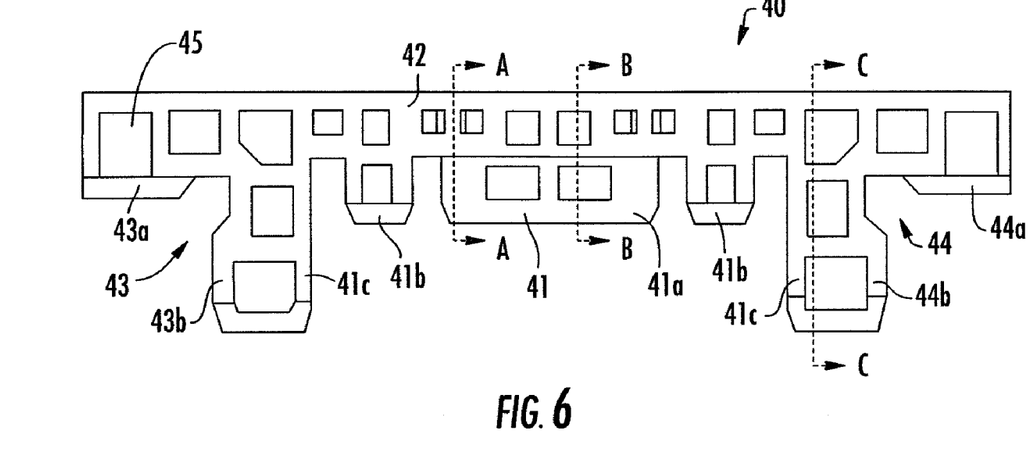
FIG. 6 illustrates a plan view of the integrally formed connector shown in FIG. 3.

FIGS. 6-12 illustrate an integrally formed connector 40 according to various embodiments of the invention. As shown in FIG. 6, the integrally formed connector 40 includes a mullion engaging portion 41, a frame engaging portion 42 positioned vertically adjacent the mullion engaging portion 41, and a first sash engaging portion 43 and a second sash engaging portion 44 that extend laterally adjacent each side of the mullion engaging portion 41. In addition, the first sash engaging portion 43 and the second sash engaging portion 44 extend vertically adjacent the frame engaging portion 42. In a particular embodiment, the integrally formed connector 40 further defines a plurality of depressed portions 45 in at least one surface of the connector 40, which serves to reduce the weight without significantly compromising the strength of the integrally formed connector 40.

The frame engaging portion 42 has a generally elongated, rectangular shape, and has a width $w_f$ that is slightly less than a width $w_{cw}$ of the channel 51 defined by the window frame 50 such that the frame engaging portion 42 can be received within the channel 51 of the window frame. Similarly, the sash engaging portions 43, 44 each define a width $w_s$ that is slightly less than a width of the channel (not shown) defined by the sashes 70, 80, respectively, such that the sash engaging portions 43, 44 can be received within the channels of the sashes 70, 80. In particular, in the embodiment shown in FIG. 6, the first sash engaging portion 43 comprises a horizontal portion 43a and a vertical portion 43b for engaging the horizontal portion of the sash 70 and the vertical portion of the sash 70, respectively. Each of the horizontal portion 43a and the vertical portion 43b is dimensioned to be received into the respective portion of the sash 70. Similarly, the second sash engaging portion 44 comprises a horizontal portion 44a and a vertical portion 44b for engaging the horizontal portion of the sash 80 and the vertical portion of the sash 80, respectively. Each of the horizontal portion 44a and the vertical portion 44b is dimensioned to be received into the respective portion of the sash 80. The vertical portions 43a, 44a are vertically adjacent each end of the frame receiving portion 42.

The mullion engaging portion 41 is generally located toward the center of the integrally formed connector 40 and has a length $l_{me}$ and width $w_{me}$ that is slightly less than the interior length and width of the cavity 31 of the reinforcement member 30 such that the integrally formed connector 40 fits within the cavity 31. In the particular embodiment shown in FIGS. 6-12, the mullion engaging portion 41 includes a primary inner portion 41a, two secondary inner portions 41b, and two outer portions 41c. The primary inner portion 41a is located generally toward the center of the integrally formed connector 30 and is positioned within the cavity 31 of the reinforcement member when the integrally formed connector 40 is assembled into the window assembly 10. The secondary inner portions 41b are each located laterally adjacent each side of the primary inner portion 41a and are positioned within cavities 28a, 28b defined within the mullion 20 when the integrally formed connector 40 is assembled into the window assembly 10. The two outer portions 41c are each located laterally adjacent each of the two secondary inner portions 41b such that the secondary inner portions 41b are between the two outer portions 41c and the primary inner portion 41a, and the two outer portions 41c are positioned within the channels 27 defined in the mullion 20 for receiving the sashes 70, 80 when the integrally formed connector 40 is assembled into the window assembly 10. In the embodiment shown in FIGS. 6-12, the two outer portions 41c of the mullion engaging portion 41 are each laterally adjacent and positioned inwardly of the vertical sash engaging portions 43b, 44b.

Figure 7:
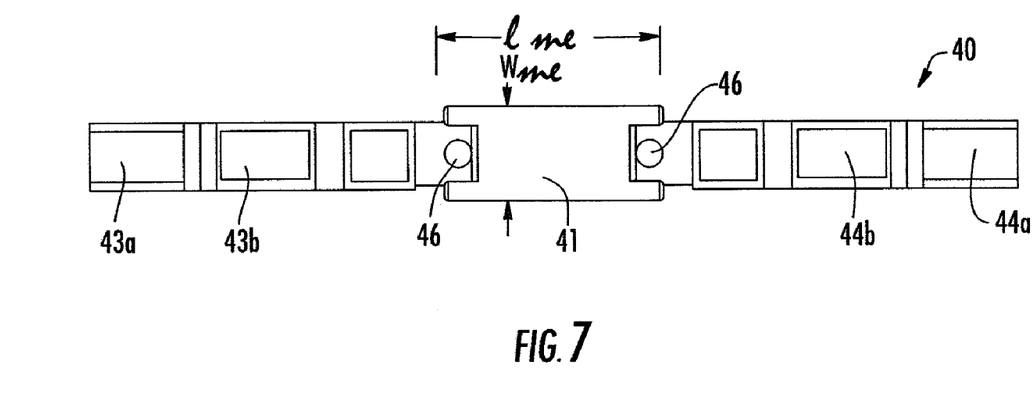
FIG. 7 illustrates a bottom view of the integrally formed connector shown in FIG. 3.
Figure 8:
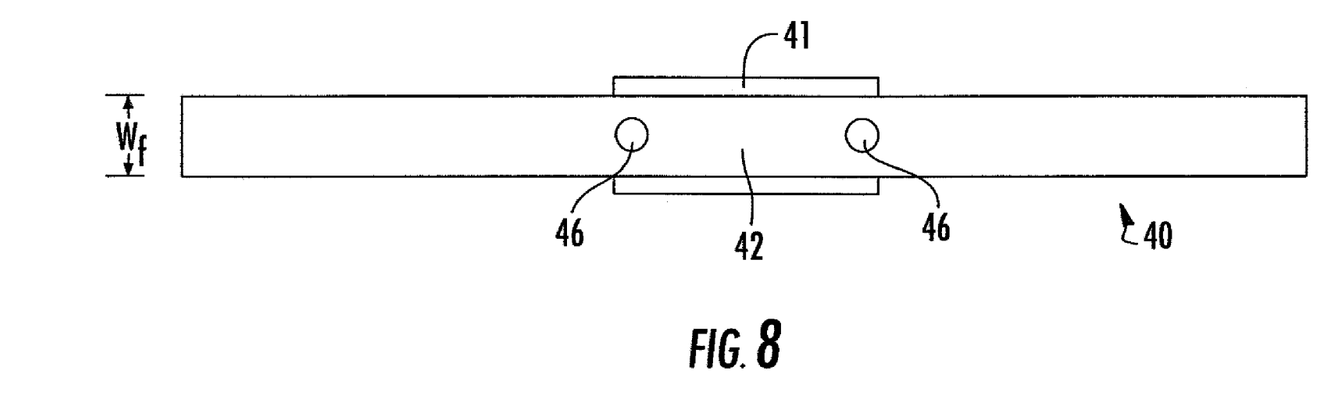
FIG. 8 illustrates a top view of the integrally formed connector shown in FIG. 3.
Figure 9:
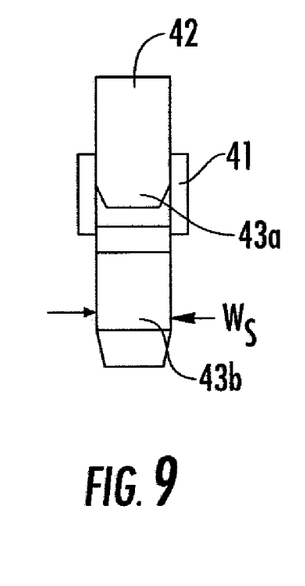
FIG. 9 illustrates an end view of the integrally formed connector shown in FIG. 3.
Figure 10:
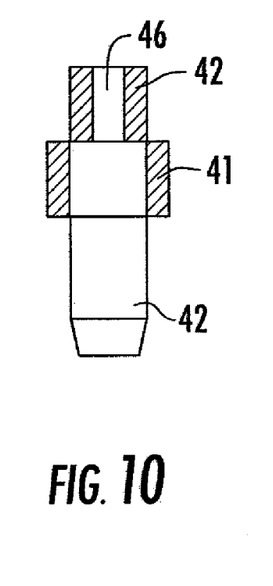
FIG. 10 illustrates a cross sectional view of the integrally formed connector along the A-A line shown in FIG. 6.
Figure 11:
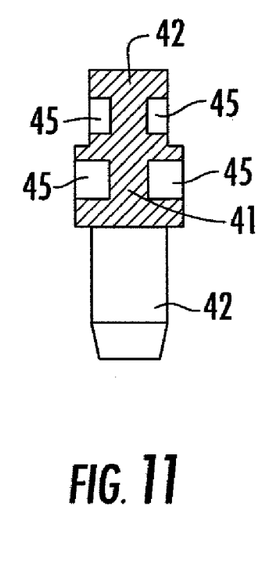
FIG. 11 illustrates a cross sectional view of the integrally formed connector along the B-B line shown in FIG. 6.
Figure 12:
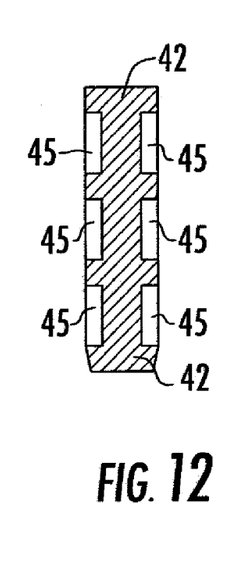
FIG. 12 illustrates a cross sectional view of the integrally formed connector along the C-C line shown in FIG. 6.

As shown in FIGS. 7, 8, and 10, various embodiments of the integrally formed connector 40 further define at least one aperture for receiving a fastener to secure the reinforcement member 30, the integrally formed connector 40, and the window frame 50 together. In a particular embodiment, the integrally formed connector 40 defines two apertures 46 that extend through the frame receiving portion 42 and the mullion receiving portion 41 such that a fastener (not shown) can extend from the window frame 50, through the connector 40, and into the reinforcement member 30.

In a particular embodiment of the invention, the integrally formed connector 40 is molded from a polymeric material (e.g., plastic). However, in various other embodiments, the integrally formed connector 40 may be formed of other suitable materials such as metal (e.g., zinc, steel) or rubber, for example.

Window Frame

Figure 13:
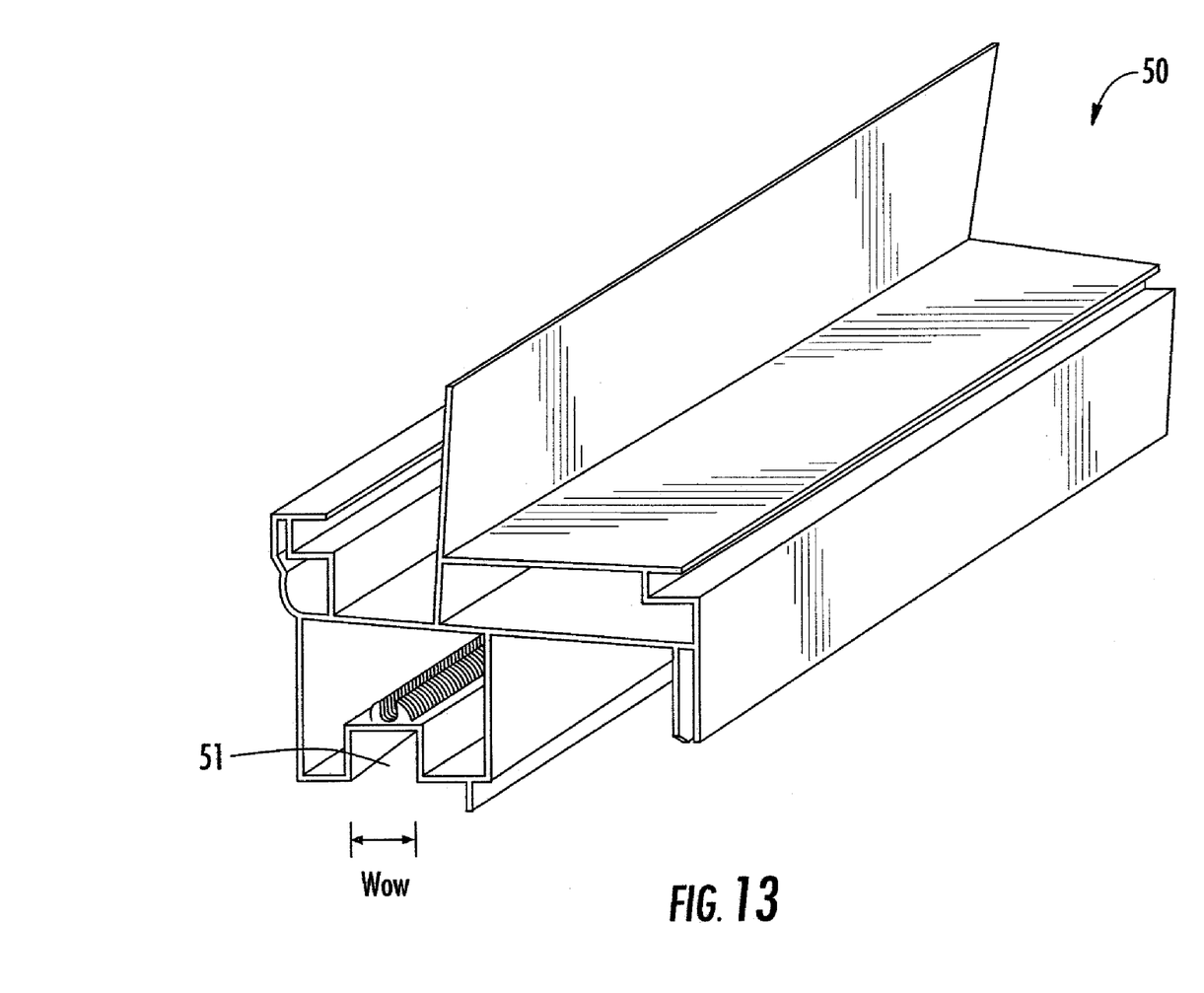
FIG. 13 illustrates a perspective view of the upper window frame shown in FIG. 2.
Figure 14:
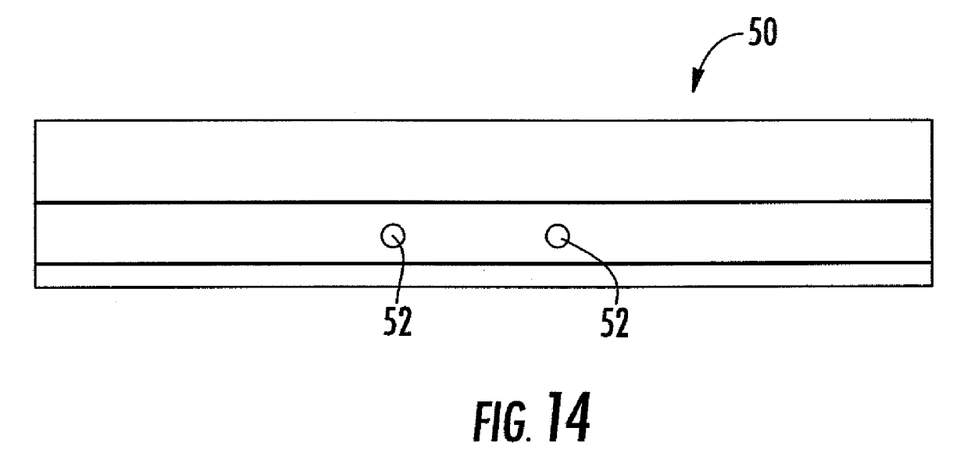
FIG. 14 illustrates a top view of the upper window frame shown in FIG. 13.
Figure 15:
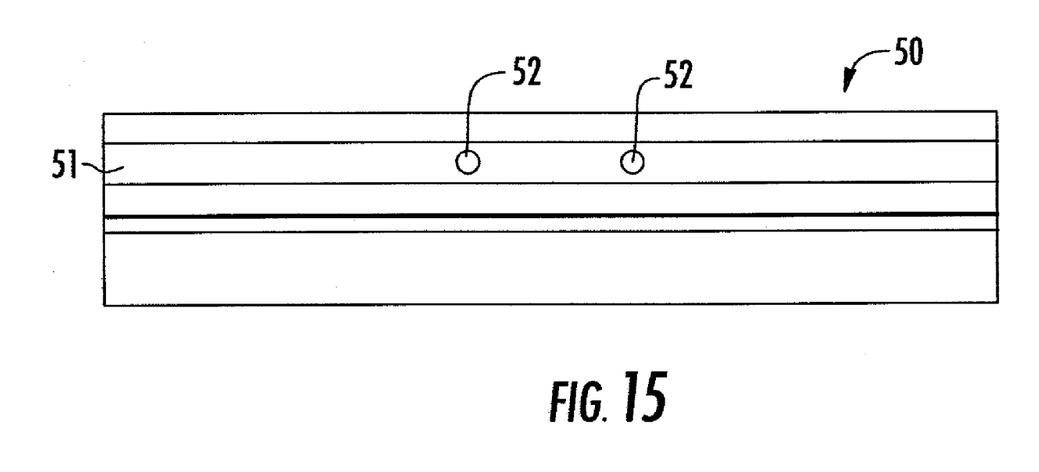
FIG. 15 illustrates a bottom view of the upper window frame shown in FIG. 13.

FIGS. 13-15 illustrate a window frame 50 according to various embodiments of the invention. In particular, the window frame 50 shown is an upper window frame that is used with a mullion to join the sashes of two windows into a single window assembly. As noted above, the window frame 50 defines channel 51 along a lower surface thereof that is dimensioned to receive the frame engaging portion 42 of the integrally formed connector 40. In addition, the window frame 50 further defines one or more apertures for receiving a fastener to secure the window frame 50 with the integrally formed connector 40 and the reinforcement member 30. In the embodiment shown in FIGS. 13-15, the window frame 50 defines two apertures 52 that each extend from an upper surface of the window frame 50 through the channel 51 defined in the lower surface of the window frame 50 such that a fastener, such as a screw or bolt, can be engaged into each aperture 52 from the upper surface of the window frame 50, out of the channel 51, through the apertures 46 defined by the integrally formed connector 40, and into the apertures 33 defined by the reinforcement member 30.

In one embodiment of the invention, the window frame 50 is formed of vinyl or other polymeric material, which results in a relatively lightweight window frame 50. However, it should be understood that the window frame 50 may be formed of another suitable material other than vinyl or polymeric material, such as metal (e.g., aluminum) or wood, for example.

Method of Assembly

To assemble the window assembly 10 according to various embodiments of the invention, the reinforcement member 30 is positioned within the cavity 24 of the mullion 20 adjacent the first end 21 of the mullion 20. Next, the primary portion of the mullion engaging portion 41 of the integrally formed connector 40 is positioned within the second cavity 31 of the reinforcing member 30 such that the frame engaging portion 42 of the integrally formed connector 40 extends above the first end 21 of the mullion 20 and the first sash engaging portion and the second sash engaging portion extend laterally adjacent each of two opposite sides of the first end 21 of said mullion 20. Then, the window frame 50 is positioned adjacent the frame engaging portion 42 of the integrally formed connector such that a channel 51 defined by the window frame 50 receives the frame engaging portion 42. The reinforcement member 30, the window frame 50, and the integrally formed connector 40 are then secured together by inserting fasteners through apertures 52 defined by the window frame 50, apertures 46 defined by the integrally formed connector 40, and apertures 33 defined by the reinforcing member 30 that align with each other. After securing the window frame 50, the connector 40, and the reinforcing member 30 together, a sash 70, 80 is fitted adjacent each side of the window frame 50 and the mullion 20. Each sash 70, 80 defines at least one channel for receiving the first and second sash engaging portions 43, 44 of the integrally formed connector 40.

CONCLUSION

Although this invention has been described in specific detail with reference to the disclosed embodiments, it will be understood that many variations and modifications may be effected within the spirit and scope of the invention as described in the appended claims.

The invention claimed is:

1. An integrated window assembly for joining a window frame with a mullion, said assembly comprising:
    a window frame comprising an upper surface and a lower surface and defining a channel along said lower surface, said window frame further defining one or more apertures that each extend through said upper surface and said channel of said window frame;
    a mullion comprising a first end, a second end, and an elongated body extending between said first end and said second end, said mullion defining a first cavity adjacent said first end that extends at least partially through said elongated body;
    a reinforcement member positioned within said first cavity of said mullion, said reinforcement member defining a second cavity adjacent an end of said reinforcement member that is adjacent said first end of said mullion and has one or more apertures configured for receiving a fastener; and
    an integrally formed connector comprising a mullion engaging portion, a frame engaging portion, a first sash engaging portion, and a second sash engaging portion, said mullion engaging portion being positioned laterally between said first and second sash engaging portions, and said frame engaging portion being positioned vertically adjacent said mullion engaging portion and said first and second sash engaging portions,
    wherein:
        at least a portion of said mullion engaging portion engages said second cavity of said reinforcement member, at least a portion of said frame engaging portion engages said channel of said window frame, and at least a portion of each of said first and second sash engaging portions engage a channel defined by each of a first sash and second sash, respectively,
        said integrally formed connector further defines one or more apertures, said one or more apertures of said integrally formed connector and said reinforcement member being vertically aligned when said mullion engaging portion is positioned within said cavity of said reinforcement member, and
        said one or more apertures of said window frame are vertically alignable with said one or more apertures of said integrally formed connector and said reinforcement member and said one or more apertures are configured for receiving a fastener for securing said integrally formed connector, said reinforcement member, and said window frame together when said frame receiving portion is positioned within said channel of said window frame.

2. The assembly of claim 1 wherein:
    said frame receiving portion has a first width that is less than a width of said channel of said window frame,
    said mullion receiving portion has a second width less than a width of said second cavity, and
    said sash receiving portion has a third width less than a width of a channel of said sash.

3. The assembly of claim 2 wherein said second width is larger than said first width and said third width.

4. The assembly of claim 2 wherein said first width, said second width, and said third width are substantially the same.

5. The assembly of claim 1 wherein said integrally formed connector comprises a plurality of depressed portions along at least one surface of said integrally formed connector, said depressed portions configured for reducing a weight of said integrally formed connector.

6. The assembly of claim 1 wherein said reinforcement member defines one or more protrusions that extend into said second cavity, each of said one or more protrusions defining one of said one or more apertures.

7. The assembly of claim 1 wherein:
    said mullion further defines a third cavity, a fourth cavity, a first channel, and a second channel, wherein said first cavity is laterally between said third cavity and said fourth cavity, said third cavity is laterally between said first channel and said first cavity, and said fourth cavity is laterally between said second channel and said first cavity, said mullion engaging portion comprises a primary inner portion configured for engaging said second cavity of said reinforcement member, a first secondary inner portion configured for engaging said third cavity, a second secondary inner portion configured for engaging said fourth cavity, a first outer portion configured for engaging said first channel, and a second outer portion configured for engaging said second channel, wherein said primary inner portion, said first and second secondary inner portions, and said first and second outer portions are laterally adjacent each other and vertically adjacent said frame engaging portion.

8. The assembly of claim 7 wherein said reinforcement member is manufactured from one of steel or aluminum and said integrally formed connector is manufactured from a polymeric material.

9. The assembly of claim 1 wherein said first sash engaging portion comprises a first horizontal sash engaging portion and a first vertical sash engaging portion, said first horizontal sash engaging portion configured for engaging a horizontal channel defined by said first sash and said first vertical sash engaging portion configured for engaging a vertical channel defined by said first sash.

10. The assembly of claim 1 wherein said second sash engaging portion comprises a second horizontal sash engaging portion and a second vertical sash engaging portion, said second horizontal sash engaging portion configured for engaging a horizontal channel defined by said second sash and said second vertical sash engaging portion configured for engaging a vertical channel defined by said second sash.

11. An integrated window assembly for joining a window frame with a mullion, said assembly comprising:
   a window frame comprising an upper surface and a lower surface and defining a channel along said lower surface, said window frame further defining one or more apertures that each extend through said upper surface and said channel of said window frame;
   a mullion comprising a first end, a second end, and an elongated body extending between said first end and said second end, said mullion defining a cavity adjacent said first end that extends at least partially through said elongated body, said mullion defining one or more apertures configured for receiving a fastener; and
   an integrally formed connector comprising a mullion engaging portion, a frame engaging portion, a first sash engaging portion, and a second sash engaging portion, said mullion engaging portion being positioned laterally between said first and second sash engaging portions, and said frame engaging portion being positioned vertically adjacent said mullion engaging portion and said first and second sash engaging portions,
   wherein:
      at least a portion of said mullion engaging portion engages said cavity of said mullion, at least a portion of said frame engaging portion engages said channel of said window frame, and at least a portion of said first and second sash engaging portions engage a channel defined by each of a first sash and second sash, respectively,
      said integrally formed connector further defines one or more apertures, said one or more apertures of said integrally formed connector and said mullion being vertically aligned when said mullion engaging portion is positioned within said cavity of said mullion, and
      said one or more apertures of said window frame are vertically alignable with said one or more apertures of said integrally formed connector and said mullion and said one or more apertures are configured for receiving a fastener for securing said integrally formed connector, said mullion, and said window frame together when said frame receiving portion is positioned within said channel of said window frame.

12. A method of assembling an integrated window to a mullion, the method comprising the steps of:
   providing a mullion comprising a first end, a second end, and an elongated body portion extending between said first end and said second end, said mullion defining a first cavity adjacent said first end that extends at least partially through said elongated body portion;
   positioning a reinforcement member within at least a portion of said first cavity, said reinforcement member extending from said first end toward said elongated body portion and defining a second cavity adjacent an end of said reinforcement member that is adjacent said first end of said mullion;
   providing an integrally formed connector comprising a mullion engaging portion, a frame engaging portion, a first sash engaging portion, and a second sash engaging portion, said mullion engaging portion being positioned laterally between said first and second sash engaging portions, and said frame engaging portion being positioned vertically adjacent said mullion engaging portion and said first and second sash engaging portions;
   positioning said mullion engaging portion of said integrally formed connector within said second cavity of said reinforcing member such that said frame engaging portion of said integrally formed connector extends above said first end of said mullion and at least a portion of said first and second sash engaging portions extends laterally adjacent each side of said first end of said mullion;
   positioning a window frame adjacent said frame engaging portion of said integrally formed connector such that a channel defined by said window frame receives said frame engaging portion;
   securing said mullion and said window frame together by inserting at least one fastener through said window frame, said connector, and said reinforcing member; and
   fitting a first sash adjacent a first side of said window frame and said mullion and a second sash adjacent a second side of said window frame and said mullion, said first sash defining at least one channel receiving said first sash engaging portion and said second sash defining at least one channel receiving said second sash engaging portion.

* * * * *

UNITED STATES PATENT AND TRADEMARK OFFICE
CERTIFICATE OF CORRECTION

PATENT NO. : 7,596,912 B2  Page 1 of 1
APPLICATION NO. : 11/768564
DATED : October 6, 2009
INVENTOR(S) : Ito et al.

It is certified that error appears in the above-identified patent and that said Letters Patent is hereby corrected as shown below:

Column 5,

Lines 6 and 7, "cavity 21", both occurrences, should read --cavity 24--.

Signed and Sealed this

Thirtieth Day of March, 2010

David J. Kappos
*Director of the United States Patent and Trademark Office*